3,789,041
MELAMINE-FORMALDEHYDE RESINS CONTAINING CALCIUM CARBONATE
Herbert Talsma, East Cleveland, Ohio, assignor to The Standard Oil Company, Cleveland, Ohio
No Drawing. Continuation-in-part of abandoned application Ser. No. 203,031, Nov. 29, 1971. This application Dec. 8, 1972, Ser. No. 313,545
Int. Cl. C08g 51/18
U.S. Cl. 260—17.3          5 Claims

ABSTRACT OF THE DISCLOSURE

Melamine-formaldehyde resins containing 10 to 900 parts by weight of calcium carbonate per hundred parts of resin are excellent for use in preparing molded resin articles because of the lower post-mold shrinkage, the improved impact strength and the better heat stability than the resin without calcium carbonate.

BACKGROUND OF THE INVENTION

This is a continuation-in-part application of our copending patent application Ser. No. 203,031 filed Nov. 29, 1971 and now abandoned.

Melamine-formaldehyde resins are well known and commercially produced for a number of applications, such as their use in dinnerware. Most formulations include cellulose which is incorporated to improve the physical strength of the resin and of articles manufactured from the resin. Other materials, however, could also be added.

The melamine-formaldehyde resins, even with cellulose, have the disadvantage that they have rather high post-mold shrinkage. Attempts have been made to minimize this drawback, but solutions have created additional problems.

Various materials have been incorporated into melamine-formaldehyde resins. For example, pigments, catalysts, flow agents and other materials are usually found in resin compositions. In addition to these materials normally found in a resin, fillers or extenders have also been added. Glass and cotton have been employed, but these materials deleteriously affect the processing of the resin because of the difficulty of handling and metering these filled materials in conventional process equipment employed to fabricate molded melamine articles.

SUMMARY OF THE INVENTION

It has now been discovered according to the present invention that melamine-formaldehyde resins containing about 10 to 900 parts by weight of calcium carbonate per hundred parts of resin are very desirable resins which exhibit a desirably low post-mold shrinkage, improved impact strength and better heat stability than the unmodified resin.

The new modified resin compositions of the present invention are prepared from the well-known base of a normal melamine-formaldehyde resin; see for example Kirk-Othmer, Encyclopedia of Chemical Technology, 1963, under amino resins. Such resins may contain essentially any proportion of melamine to formaldehyde, with those resins containing molar ratios of melamine to formaldehyde of about 1:1.2 to 1:3 being preferred. The known techniques in the formulation and process of these resins apply equally well to their use in the present invention. No significant modification is required in either the components of the base resin or the equipment employed to prepare the new resins.

The significant feature of the new modified resins is that they contain an amount of calcium carbonate which enhances the desirability of the final product while allowing substantially the same or even better processing of the resin formulation. In the broad concept of the invention the melamine-formaldehyde resin may contain from about 10 to about 900 parts by weight of calcium carbonate per hundred parts of resin (p.h.r.). Generally resins containing calcium carbonate in amounts of less than 200 parts per hundred parts of resin require additional fillers as, for example, cellulose, in order to strengthen the resin. However with calcium carbonate concentrations above this range, the addition of cellulose is generally not necessary but cellulose may be added if desired. The preferred concentrations of calcium carbonate in the formulations requiring supplemental filler range from about 20 to 80 parts per hundred parts of resin, with resins containing from about 30 to about 70 parts by weight of calcium carbonate being of special interest because of their desirable properties for commercial articles. With resin formulations not requiring the additional filler, the preferred concentration of calcium carbonate may range from about 200 to 600 parts per hundred parts of resin.

The calcium carbonate is suitably added in many places during the preparation of the resin. Preferably the calcium carbonate is physically incorporated into the resin during a step in which the dry resin is thoroughly ground into a molding powder. This technique assures the desired homogeneity.

As noted in the Background of the Invention, melamine-formaldehyde resins may contain additional materials which strengthen the resin. The present compositions may include any of these additives. Of greatest interest in this field are resins containing cellulose. Resins containing about 5 to about 70 parts by weight of cellulose per hundred parts of resin are preferred, with compositions containing about 30 to about 60 parts by weight of cellulose being of special interest because of the desirable strength of the final composition.

The significant advantage of the melamine-formaldehyde resins of the invention are numerous. The outstanding feature of the final resin is its reduced post-mold shrinkage, which is reduced about 40 to 60% using the resins of the present invention. This characteristic is very important when articles are produced with various extraneous objects added, such as metal inserts commonly employed in electronic components. This post-mold shrink problem of melamine resins without calcium carbonate has prevented the use of these resins in applications where closed dimensional tolerances after heating are required.

A second and important advantage of the resins of the present invention is their higher impact strength. This higher impact strength allows the use of thinner-walled articles while at the same time identical breakage characteristics as the unmodified resins are retained. Also, for articles having walls of equivalent thicknesses as the unmodified resins, the breakage characteristics are substantially improved.

A third important advantage is the improved heat stability of the modified resins. This advantage allows molding at higher temperatures which substantially reduces the molding cycle. In addition, the finished product has significantly improved thermal and light stability which permits use of the molded article in applications which involve higher temperatures, such as use in cooking, including food containers for heating in microwave ovens, light deflectors and the like.

Additional advantages include: essentially the same flow characteristics as the unmodified resin; greater density which makes dinnerware fabricated from the resin feel more like high quality china; ease of processability in standard equipment; and lower cost of the final product; all of these advantages are obtained without a significant sacrifice of the desirable characteristics of the basic resin formulation.

SPECIFIC EMBODIMENTS

Comparative Example A.—Preparation of the melamine-formaldehyde resin containing 52 parts of cellulose per hundred parts of resin (p.h.r.)

The preparation of standard melamine-formaldehyde molding powder is carried out as follows:

756 parts (6 moles) of melamine and 1362 parts (16 moles) of 37% aqueous formaldehyde solution were introduced into a reaction vessel equipped with a reflux condenser, thermometer and stirrer. The mixture was stirred for several minutes to break up aggregated material and to form a uniform dispersion of the melamine throughout the mixture. The pH of the mixture was adjusted to 8.0 (glass electrode at 25° C.) using 1 N sodium hydroxide. The reaction mixture was then heated to reflux and reflux continued until one drop of the clear resin hydrophobed (Encylopedia of Polymer Science and Technology, volume 2, page 30) in 25 cc. of water (25° C.). The resin was cooled, added to 582 grams of alpha-cellulose and mixed by hand until no free resin syrup remained. The product was then mixed in a sigma blade mixer for a period of one hour.

The alpha-cellulose resin mixture was dried in an air stream for one hour at 190° F. and 18% relative humidity. The resulting dried product was ground on a screen mill to produce a powder in which the maximum particle size was less than 800 microns. The ground powder, along with 0.5 part of zinc stearate, 0.5 part of rutile titanium dioxide and 0.13% phthalic anhydride were milled in a ball mill for five hours. At this point, other pigments, dyes and additives for flow and mold release were added. The resin was then molded at a pressure of 3000 p.s.i. and at a temperature of 347° F. for a period of three minutes.

Example 1.—Resin composition containing 50 p.h.r. of calcium carbonate and 52 p.h.r. of cellulose A molding powder was prepared in the same manner as shown in Comparative Example A except that in the charge to the ball mill, 569 g. of CaCO₃ were added to give a modified resin of the present invention containing 50 p.h.r. of calcium carbonate.

Example 2.—Comparison of the properties of the modified resin of the invention to the base resin Samples of the resin prepared in the examples above were compared for post-mold shrinkage, impact strength, heat stability and flow characteristics according to the following procedures:

A. Post-mold shrinkage: Post-mold shrinkage properties were measured according to the Standard ASTM test procedure D–1299–55. In this test the post-mold shrinkage was measured in mil/inch after the samples were subjected to 220° F. for 48 hours.

B. Impact strength: Impact strength was measured by determining the first height, in inches, at which a 66 gram steel ball caused a crack when dropped on the surface of a 3½ inch diameter cup placed upside down. The cup was centered under the ball which was then dropped onto the flat bottom of the cup. The ball was raised a quarter inch for each test until a crack was formed. The cup was inspected for hairline cracks on the inside by rubbing with pencil over the surface. The impact strength was calculated in foot-pounds by multiplying the weight of the ball in pounds times the drop height in feet.

C. Heat stability: Samples of the two resins were heated together at 300° F. for 120 hours. The colors of the samples before and after heating were measured for yellowness under ASTM R–1925–62T. This test procedure determines the degree of yellowness which would be observed under daylight illumination. A yellowness index of zero indicates that the test dish is white. The instrument used for this test was a Hunterlab Model D25, Hunter Associates Laboratory, McLean, Virginia. Table I shows the difference in the yellowness value between the value before heating and the value after heating.

D. Flow: Flow properties were measured according to the standard ASTM test procedure D–569–59 (method B). In this test the degree of flow of the sample was measured in inches when subjected to a prescribed pressure for a prescribed length of time in an extrusion mold. Measurements were made in a Rossi-Peakes flow tester as described in U.S. Pat. 2,066,016.

TABLE I

Comparison of melamine-formaldehyde resin containing calcium carbonate to unmodified melamine-formaldehyde resin]

| Test | Resin of— | |
|---|---|---|
| | Comparative Example A | Example 1 |
| Post-mold shrinkage (mils/inch) | 17 | 7.4 |
| Impact strength (foot-pounds) | 0.15 | 0.19 |
| Heat stability (difference in yellowness index units) | 37.5 | 21.6 |
| Flow (inches) | 0.35 | 0.40 |

As can be seen from Table I, the resin modified with calcium carbonate is substantially superior to the unmodified resin in all properties shown.

In the same manner as described by the examples above, calcium carbonate is added to melamine-formaldehyde resins containing different amounts of cellulose, for example resins containing 5, 10, 20, 35, 40, 60 or 70 p.h.r. of cellulose. Also, in the same manner shown in the examples, different amounts of calcium carbonate are added to the melamine-formaldehyde-cellulose formulation. For example, resins containing 10, 20, 30, 40, 50, 60, 70, 80, 90, 100, 110, 120 or 150 p.h.r. of calcium carbonate are prepared.

In the same manner as shown for cellulose, other strengthening agents, such as asbestos, glass or cotton, are employed in the resins of the invention containing calcium carbonate.

Also in the same manner as described for the resins containing cellulose, resins without cellulose are prepared. Such resins of melamine-formaldehyde suitably contain the same amounts of calcium carbonate as shown in the examples above even though no cellulose is present.

The improved physical properties of a resin containing 342 p.h.r. of calcium carbonate (79 percent by weight) without cellulose (Example 3) as compared with standard melamine-formaldehyde molding powder (Example A) are shown in Table II.

Example 3—Resin composition containing 342 p.h.r. of calcium carbonate

The resin of Example 3 was prepared as follows:
567 grams (4.5 moles) of melamine and 820 grams (10.1 moles) of 37% aqueous formaldehyde solution (pH adjusted to 8.0 with NaOH) were introduced into a reaction vessel equipped with a reflux condenser, thermometer and stirrer. The reaction mixture was heated to reflux and refluxing continued until one drop of the clear resin hydrophobed in 25 cc. of water at 25° C. The warm resin thus produced was added to 2970 grams of calcium carbonate in a sigma blade mixer preheated to 158° F. with stirring. The wet slurry was then dried and ground to a powder. 864 grams of this ground powder along with 1 gram of zinc stearate, 0.5 gram of phthalic anhydride and other pigments, dyes and additives for flow and mold release were milled in a ball mill for three hours. The resin was then molded at a pressure of 3000 p.s.i. and at a temperature of 347° F. for a period of three minutes.

A. Heat stability: The heat stability tests employed in these examples were carried out in an air-circulated oven at the time and temperature indicated.

B. Light reflection. The percent light reflection was determined in a Kollmorgen "Color Eye" and was calculated from the ratio of the tristimulus Y value for the sample to the tristimulus Y° value for the magnesium oxide standard, multiplied by 100.

TABLE II

| Test | Resin of— | |
|---|---|---|
| | Comparative Example A | Example 3 |
| Post-mold shrinkage (mils/inch) | 17 | 7.3. |
| Heat stability at— | | |
| 275° F | Discoloration after <2 days | No discoloration after 31 days. |
| 300° F | Discoloration after <1 day | No discoloration after 21 days. |
| Microwave oven test (70 sec.) | Cracked; brown discoloration; loss of formaldehyde vapors after 50 seconds. | No cracking; no discoloration; no loss of formaldehyde vapors. (surface temp. 185° F.) |
| Percent reflection against MgOy/Y°×100 | 72.0 | 82.4. |
| Flow (inches) | 0.35 | 1.00. |

Example 4—Resin composition containing 570 p.h.r. of calcium carbonate 170 grams of calcium carbonate, 30 grams of spray dried melamine-formaldehyde resin (Monsanto No. 817 molar ratio of melamine/formaldehyde, 1:3), 1 gram of zinc stearate, 0.2 gram of phthalic anhydride and other pigments, dyes and additives for flow and mold release were milled in a ball mill for three hours. The resin was then molded at a pressure of 3000 p.s.i. and at a temperature of 347° F. for a period of three minutes. The resin obtained had good molding properties and its physical properties were similar to those of Example 3.

I claim:

1. A melamine-formaldehyde resin composition containing about 10 to about 900 parts by weight of calcium carbonate per hundred parts of resin (p.h.r.).

2. The resin composition of claim 1 containing from about 200 to about 600 parts of calcium carbonate p.h.r.

3. The resin composition of claim 1 containing from about 10 to about 200 parts by weight of calcium carbonate p.h.r.

4. The resin composition of claim 3 containing about 5 to about 70 p.h.r. of cellulose.

5. The resin composition in claim 4 containing about 20 to about 80 p.h.r. of calcium carbonate and about 30 to about 60 p.h.r. of cellulose.

References Cited
UNITED STATES PATENTS
2,830,035   4/1958   Renner et al. _____ 260—67.6

WILLIAM H. SHORT, Primary Examiner

E. WOODBERRY, Assistant Examiner

U.S. Cl. X.R.
260—39 R, 67.6 R

UNITED STATES PATENT OFFICE
CERTIFICATE OF CORRECTION

Patent No. 3,789,041　　　　　　　　　Dated January 29, 1974

Inventor(s) Herbert Talsma

It is certified that error appears in the above-identified patent and that said Letters Patent are hereby corrected as shown below:

| | | |
|---|---|---|
| Column 1: | Line 63 | "process" should be --processing--. |
| Column 1: | Line 64 | after "the" insert --resins of the--. |
| Column 2: | Line 6 | "fillers" should be --filler--. |
| Column 2: | Line 46 | "closed" should be --close--. |
| Column 3: | | Starting with column 3 -- put a period after each of the titles of each example. |
| Column 3: | Line 70 | "R" should be --D--. |
| Column 4: | | Title of Tqble I, 2nd line, delete "]" (bracket). |

Signed and sealed this 1st day of April 1975.

(SEAL)
Attest:

RUTH C. MASON
Attesting Officer

C. MARSHALL DANN
Commissioner of Patents
and Trademarks